United States Patent
Im et al.

(10) Patent No.: US 7,960,021 B2
(45) Date of Patent: Jun. 14, 2011

(54) COMPOSITION FOR ANTI-GLARE FILM AND ANTI-GLARE FILM PREPARED USING THE SAME

(75) Inventors: Sang-Hyuk Im, Daejeon Metropolitan (KR); Yeong-Rae Chang, Daejeon Metropolitan (KR); Jae Pil Koo, Daejeon Metropolitan (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/451,461

(22) PCT Filed: May 16, 2008

(86) PCT No.: PCT/KR2008/002768
§ 371 (c)(1),
(2), (4) Date: Nov. 13, 2009

(87) PCT Pub. No.: WO2008/140282
PCT Pub. Date: Nov. 20, 2008

(65) Prior Publication Data
US 2010/0143702 A1    Jun. 10, 2010

(30) Foreign Application Priority Data
May 16, 2007   (KR) ................... 10-2007-0047596

(51) Int. Cl.
*B32B 5/16* (2006.01)
*G02B 27/00* (2006.01)

(52) U.S. Cl. ........ 428/327; 428/323; 428/328; 428/330; 428/331; 359/601

(58) Field of Classification Search .............. None
See application file for complete search history.

(56) References Cited

U.S. PATENT DOCUMENTS

| | | |
|---|---|---|
| 6,343,865 B1 | 2/2002 | Suzuki |
| 2003/0194533 A1 | 10/2003 | Amimori et al. |
| 2006/0204718 A1 | 9/2006 | Kawakami |
| 2009/0267270 A1 * | 10/2009 | Murakami et al. ............ 264/447 |

FOREIGN PATENT DOCUMENTS

| | | |
|---|---|---|
| JP | 2000-329905 A | 11/2000 |
| JP | 2002-221610 A | 8/2002 |
| KR | 10-2001-0111362 A | 12/2001 |
| KR | 2003-00649333 | 8/2003 |
| KR | 10-2008-0101801 | 11/2008 |
| WO | WO 01/98222 A1 | 12/2001 |

\* cited by examiner

*Primary Examiner* — Sheeba Ahmed
(74) *Attorney, Agent, or Firm* — McKenna Long & Aldridge LLP (57) ABSTRACT

The present invention provides a composition for an anti-glare film that includes a binder resin; and a core-shell particle having an average surface roughness ([Rz]) in the range of 0 to 2/M, and an anti-glare film that is manufactured by using the same. Accordingly, the storage stability of a particle that is included in an anti-glare film for high resolution is improved to increase the durability and a lifespan of products, a glare phenomenon that is caused by incident light and recognized by an user is prevented, and image clarity and contrast ratio that is realized by using an image display device are improved.

26 Claims, 3 Drawing Sheets

COMPOSITION FOR ANTI-GLARE FILM AND ANTI-GLARE FILM PREPARED USING THE SAME

This application is a National Stage Entry of International Application No. PCT/KR2008/002768, filed on May 16, 2008, and claims priority to Korean Patent Application No. 2007-0047596, filed on May 16, 2007, which is hereby incorporated by reference in its entirety as if fully set forth herein.

TECHNICAL FIELD

The present invention relates to a composition for an anti-glare film which has excellent storage stability, anti-glare property, image clarity and contrast and is capable of being applied to high resolution displays, and an anti-glare film that is produced by using the same.

This application claims priority from Korean Patent Application No. 2007-0047596 filed on May 16, 2007 in the KIPO, the disclosure of which is incorporated herein by reference in its entirety.

BACKGROUND ART

Currently, in accordance with the trend toward the high-speed and high density of information transfer, and requirement of consumers for high-quality products such as large screen, high-quality images, multifunction and high performance, large-sized flat panel displays (FPD) are used. In accordance with the trend toward large size and slimness of displays and an increase in demand for notebook PC, various types of flat displays such as LCDs, PDPs, Rear-projection TVs and the like are developed and commercialized. However, in the case the displays are exposed to external light such as natural light, the surface reflection light provides fatigueness to eyes of the user or causes a headache, and an image clarity that is formed in the display is not recognized as a clear image.

In order to overcome the disadvantages of the prior art, the concave and the convex are formed on the display surface to scatter external light on the surface, thereby obtaining the anti-glare effect. However, there still exists a problem wherein the image is reduced on the high resolution display. In order to overcome this disadvantage, a method of adding particles for inducing the internal scattering to the coating layer is suggested.

In order to solve the problems described above, various solutions are suggested. These suggestions will be described, disadvantages thereof will be analyzed and technologies for further improvement will be suggested.

Korean Registered Patent No. 10-046782 discloses a high resolution anti-glare coating layer that includes a first particle having an average diameter of 0.05 to 1 μm, in which a difference between refractive indices of an acrylate binder resin and the first particle is 0.2 to 0.5, and a second particle having an average diameter of 0.5 to 3 μm, in which a difference between refractive indices of an acrylate binder resin and the first particle is not more than 0.1. However, there is a disadvantage in that since a difference between refractive indices of the acrylate binder resin and the first particle is high, the contrast is reduced.

Meanwhile, Korean Registered Patent No. 10-037840 and Japanese Unexamined Patent Application Publication No. 2001-3178 disclose an anti-glare coating layer that includes at least two or more light transmissive particles in a binder resin, in which a difference between refractive indices of the light transmissive particle and the binder is 0.03 to 0.2 and the light transmissive particles have different refractive indices. However, there is a disadvantage in that the anti-glare property is reduced on the basis of the same image clarity and haze value and the contrast is reduced because of the haze of 10% or more.

In addition, Korean Registered Patent No. 10-0296369 discloses an anti-glare coating layer including a light transmissive diffusing agent in a binder resin, in which the external haze value by the concave and the convex of the surface thereof is 7 to 30, and the internal haze value by the light transmissive diffusing agent is 1 to 15. However, there is a disadvantage in that the contrast is reduced because of the high surface haze value. Japanese Unexamined Patent Application Publication No. 2002-67675 discloses an anti-glare coating layer that includes a spherical particle having a refractive index of 1.55 or more in a binder resin and an amorphous particle having a refractive index of 1.48 or less, in which the thickness of the binder resin is more than the average diameter of the spherical particle. However, there is a disadvantage in that the anti-glare property is reduced on the basis of the same image clarity and haze value.

Japanese Unexamined Patent Application Publication No. 2002-185927 discloses an anti-glare coating layer that includes an organic material particle having an average diameter of 1 to 7 μm and an inorganic material particle having an average diameter of 0.1 μm in the binder resin, in which the thickness of the binder resin is 0.3 to 3 times more than the average diameter of the organic material particle. However, since the inorganic material particle is not attached to the surface of the organic material particle, there is a problem in that the concave and the convex cannot be formed on the surface by the inorganic material particle, thus reducing the anti-glare effect because of the particles.

Japanese Registered Patent No. 3507344 discloses an anti-glare coating layer including at least one light transmissive particle in a binder resin, in which a difference between refractive indices of the light transmissive particle and the binder resin is 0.3 or less and which is protruded from the surface of the binder resin layer by 0.1 to 0.3 μm. However, there is a problem in that the anti-glare property is reduced on the basis of the same image clarity and haze value.

Korean Unexamined Patent Application Publication No. 10-2005-0006349 discloses a light absorption layer that includes metal oxide having a core-shell structure and a solar battery that is provided with the same. However, since indeterminate form metal oxide crystals having the high refractive index are used as a core and a shell consists of an amorphous or crystal metal oxide, there is a problem in that it cannot be applied to a composition for anti-glare coating.

In general, in the anti-glare coating film, the haze relates to external scattering because of roughness of the coating layer surface and internal scattering because of a filler in a binder resin, the anti-glare effect relates to external scattering because of the surface roughness, and the image clarity relates to the degree of diffusion of light. In addition, the degree of diffusion of light relates to a difference between refractive indices of the binder resin and the particle and the surface roughness of the coating layer. In particular, the image clarity is reduced as the surface of the coating layer becomes rough. Accordingly, since the image clarity and the anti-glare property are in an inverse proportion, in the production of the anti-glare coating film for high resolution display having the excellent image clarity and anti-glare property, the controlling of the surface roughness may be an important technical factor.

In the case of the known spherical particle, it is difficult to produce an anti-glare coating film having the excellent image clarity and anti-glare property, and RGB pixels are mixed with each other because of the lens effect of the particle.

In addition, generally, in the case the crosslinked organic material particles are used, a good solvent is used to perform monodispersion of the particles. However, in this case, since the crosslinked particles are swollen and the surface thereof becomes sticky, collision occurs between the particles and the particles are coagulated. Thus, there is a problem in that the storage stability of the coating composition is reduced.

As described above, in the prior art, in a flat display, an effort has been made continuously to sufficiently realize the antiglare effect and ensure the excellent image clarity.

DISCLOSURE OF INVENTION

Technical Problem

The present invention has been made keeping in mind the problems occurring the prior art. That is, the present invention has been made to a problem in which a function is reduced in order to improve another function because a technical improvement of the anti-glare effect and the image clarity cannot be obtained if the prior art is used. In order to solve this problem, an object of the present invention is to provide a composition for the anti-glare film, which includes particle in which the surface roughness is controlled, the storage stability is excellent, the anti-glare property is excellent, and can be applied to a display to provide a high resolution display having the excellent image clarity and contrast, and an anti-glare film produced by using the same.

Technical Solution

The present invention provides a composition for an anti-glare film that includes a binder resin; and a core-shell particle having an average surface roughness ([Rz]) in the range of 0 to 2 μm.

The present invention provides an anti-glare film that includes a binder resin; and an anti-glare layer that includes a core-shell particle having an average surface roughness ([Rz]) in the range of 0 to 2 μm.

ADVANTAGEOUS EFFECTS

According to the present invention, the storage stability of a particle that is included in an anti-glare film for high resolution is improved and the durability and the lifespan of products are increased. A glare phenomenon that is caused by incident light and recognized by an user is prevented. The image clarity and contrast ratio of an image display device are improved.

BEST MODE FOR CARRYING OUT THE INVENTION

A composition for an anti-glare film according to the present invention includes a binder resin; and a core-shell particle having an average surface roughness ([Rz]) in the range of 0 to 2 μm.

A curable acrylate-based binder resin may be used as the binder resin. The type thereof is not limited to the examples described in this application. A typical resin that is used in the art to which the present invention belongs may be used without a limit.

For example, a reactive acrylate oligomer, a polyfunctional acrylate monomer or a mixture thereof may be used. In connection with this, the reactive acrylate oligomer is an oligomer that includes at least one acrylate functional group capable of participating in the curing reaction, and the polyfunctional acrylate monomer is a monomer that includes one or more acrylate functional group capable of participating in the curing reaction.

The type of the reactive acrylate oligomer and the polyfunctional acrylate monomer is not limited thereto, but a typical resin that is used in the art to which the present invention belongs may be selected to be used without a limit.

Examples of the reactive acrylate oligomer may include a urethane acrylate oligomer, an epoxy acrylate oligomer, polyester acrylate, polyether acrylate or a mixture thereof.

Examples of the polyfunctional acrylate monomer may include dipentaerythritol hex-aacrylate, dipentaerythritol hydroxy pentaacrylate, pentaerythritol tetraacrylate, pentaerythritol triacrylate, trimethylene propyl triacrylate, propoxylated glycerol triacrylate, trimethylopropane ethoxy triacrylate, 1,6-hexanedioldiacrylate, propoxylated glycero triacrylate, tripropylene glycol diacrylate, ethyleneglycol diacrylate or a mixture thereof.

The type of the binder resin is not limited thereto, but a typical resin that is used in the art to which the present invention belongs may be selected to be used without a limit.

It is preferable that a difference between average refractive indices of the core-shell particle and the binder resin be in the range of 0 to 0.2.

It is preferable that a difference between average refractive indices of the core-shell particle and the binder resin be in the range of 0 to 0.2, and an average surface roughness ([Rz]) be in the range of 0 to 2 μm. Even though there is no state in which the surface roughness of the core-shell particle is not present, the desired effect of the present invention can be sufficiently accomplished. In the case the surface roughness is controlled at a predetermined degree, the desirable effect can be accomplished.

A difference between the average refractive index of the core-shell particle, which is calculated by using the following Equation 1, and the average refractive index of the binder resin may be in the range of 0 to 0.2.

$$\text{average refractive index} = [f_{core} n^2_{core} + f_{shell} n^2_{shell}]^{0.5} \quad \text{[Equation 1]}$$

wherein $f_{shell}$ is calculated by using $(R^3_{core\text{-}shell} - R^3_{core})/R^3_{core\text{-}shell}$, which means a volume ratio of the shell in the total core-shell particle volume, $f_{core}$ is calculated by using $(R_{core}/R_{core\text{-}shell})^3$, which means a volume ratio of the core in the total core-shell particle volume, $R_{core}$ means a radius of the core, and $R_{core\text{-}shell}$ means a radius of the core core-shell As an example of the core-shell particle that satisfies the above conditions, the average refractive index of the core-shell particle that includes the polystyrene (refractive index: 1.6) core having the diameter of 3 μm and the silica (refractive index: 1.46) shell having the thickness of 1 μm is 1.49, the refractive index of the binder resin is 1.51, and a relative difference between the refractive indices may be 0.02.

An average surface roughness ($[R_z]$) of the core-shell particle that is calculated by using the following Equation 2 is in the range of 0 to 2 μm:

$$\text{Average surface roughness} = [R_z] = \sum_{i=1}^{n} R_{zi}/n \qquad \text{[Equation 2]}$$

(average surface roughness)

wherein $R_{zi}$ is a height of an concave and a convex of the surface, and n is a number of the concave and the convex of the surface.

Figure 3:
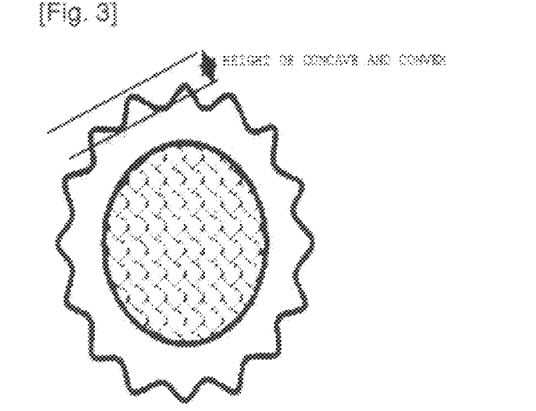

In connection with this, the height of the concave and the convex, as shown in FIG. 3 as an example thereof, is a distance between the lowermost portion of the concave and the uppermost portion of the convex.

Any method of forming a concave and a convex, which is known in the art, may be used as the method of forming the concave and the convex.

The controlling of the concave and the convex of the polymer particle may be performed by using a phase separation method, and the shape and the distribution of the concave and the convex may be controlled by thermodynamic and kinetic controlling.

In respects to the numerical range of the average surface roughness of the core-shell particle, in the case the range is more than 2 μm, the image clarity in respects to the anti-glare may be reduced.

The core-shell particle may include the core and the shell that is positioned on the surface of the core.

It is preferable that the particle diameter of the core be in the range of 0.5 to 5 μm and a difference between average refractive indices of the core and the binder resin be in the range of 0.02 to 0.3.

In the case the particle diameter of the core is less than 0.5 μm, since the scattering property is reduced, it is difficult to obtain the sufficient haze value. In the case the diameter is more than 5 μm, since the number of particles per unit volume of the coating film is reduced to reduce the inner scattering effect, it is difficult to obtain the sufficient haze value.

In the case the difference between average refractive indices of the core and the binder resin is less than 0.02, it is difficult to obtain the sufficient haze value because of the inner scattering. In the case the difference is more than 0.3, the haze value is increased because of the internal scattering while the transmittance is reduced, thus reducing the contrast ratio.

It is preferable that the thickness of the shell be in the range of 0.01 to 2 μm and a difference between refractive indices of the shell and the binder resin be in the range of 0 to 1.

In the case the thickness of the shell is less than 0.01 μm, since the thickness of the shell is very small, the storage stability becomes poor, thus making an improvement in physical properties insignificant. In the case the thickness is more than 2 μm, it is difficult to manufacture the core-shell particles and the total diameter of the core-shell particles is increased to reduce the internal scattering effect. Accordingly, it is difficult to obtain the sufficient haze value.

In the case the difference between the refractive indices of the shell and the binder resin is more than 1, the internal scattering is increased to increase the haze value but the transmittance is reduced, thus reducing the contrast ratio.

Figure 2:
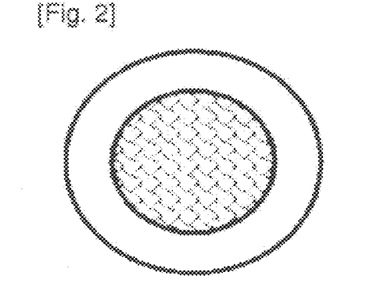
FIGS. 2 to 6 are views that schematically illustrate core-shell particles having various shapes, the surface roughness of which is controlled according to the present invention.
Figure 4:
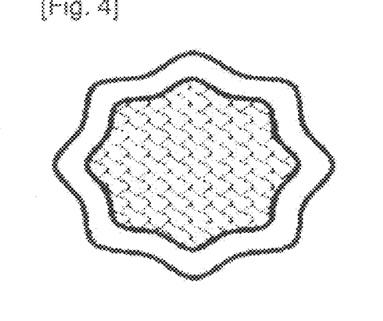

The core may have a circular cross section shape or the concave and the convex patterns may be formed on the surface of the core (see FIGS. 2 to 4). In connection with this, the concave and the convex patterns may be continuously or discontinuously formed.

The shell may have a circular cross section shape or the concave and the convex patterns may be formed on the surface of the shell (see FIGS. 2 to 4). In connection with this, the concave and the convex patterns may be continuously or discontinuously formed.

Figure 5:
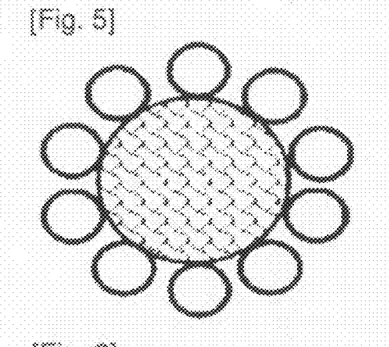
Figure 6:
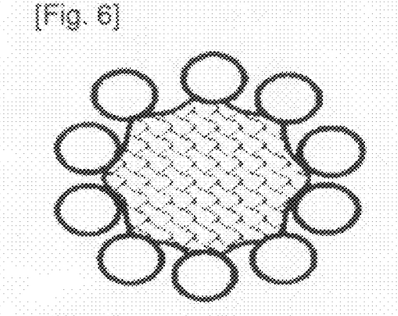

In addition, the shell may have a sphere shape on the surface of the core or a modified sphere shell particle form (see FIGS. 5 and 6).

However, in connection with this, the shape of the core and the shape of the shell are not limited thereto, and if the average surface roughness ($[Rz]$) is in the range of 0 to 2 μm, various shapes may be provided.

The core may comprise a single material or a complex thereof selected from an organic material and an inorganic material.

The shell may comprise a single material or a complex thereof selected from an organic material and an inorganic material and may be made of a material that is different from a material of the core.

The organic material that forms the core is a single material or a copolymer of two or more materials selected from polystyrene, polyacrylate-co-styrene, polymethylacrylate-co-styrene, polymethylmethacrylate-co-styrene, polycarbonate, polyvinyl chloride, polybutyleneterephthalate, polyethyleneterephthalate, polyamides, polyimides, polysulfone, polyphenylene oxide, polyacetal, epoxy resin, phenol resin, melamine resin, benzoguanamine, polydivinylbenzene, polydivinylbenzene-co-styrene, polydivinylbenzene-co-acrylate, polydiallyl phthalate, and triallylisccyanurate polymer. However, the organic material is not limited thereto.

The inorganic material that forms the core may be a single material or a complex of two or more materials selected from silica, amorphous titanium oxide, amorphous zirconium oxide, indium oxide, aluminum oxide, amorphous zinc oxide, amorphous cerium oxide, barium oxide, calcium carbonate, amorphous barium titanate, and barium sulfate. However, the inorganic material is not limited thereto.

The organic material that forms the shell may be a single material or a copolymer of two or more materials selected from polydivinylbenzene, polydivinylbenzene-co-styrene, polydivinylbenzene-co-acrylate, epoxy resin, phenol resin, melamine resin, polydiallyl phthalate, and triallylisocyanurate polymer. However, the organic material is not limited thereto.

The inorganic material that forms the shell may be a single material or a complex of two or more materials selected from silica, titanium oxide, zirconium oxide, indium oxide, aluminum oxide, zinc oxide, cerium oxide, barium oxide, calcium carbonate, barium titanate, magnesium fluoride, calcium fluoride, and barium sulfate. However, the inorganic material is not limited thereto.

The core-shell particle may be added in an amount of 1 to 30 parts by weight based on 100 parts by weight of the binder resin.

In the case the amount of the core-shell particle is less than 1 parts by weight, the haze value may be insufficient because of the internal scattering. In the case the amount of the core-shell particle is more than 30 parts by weight, the viscosity is increased to make the coating property poor and the haze value is very high because of the internal scattering. Thus, the contrast ratio may be reduced.

Any method of manufacturing the core-shell particle, which is known in the art, may be used as a method of manufacturing the core-shell particle.

In addition, the composition for an anti-glare film according to the present invention may further include an organic solvent, and the organic solvent may be added in an amount of 50 to 500 parts by weight based on 100 parts by weight of the binder resin. Preferably, the composition for an anti-glare film according to the present invention may include a binder resin, a core-shell particle and an organic solvent.

In the case the amount of the organic solvent is less than 50 parts by weight, since the viscosity of the coating composition is very high, the coating property may be poor. In the case the amount of the organic solvent is more than 500 parts by weight, the film strength of the coating film is reduced and it is difficult to manufacture it as a thick film.

The organic solvent may be a single material selected from $C_1$ to $C_6$ lower alcohols, acetates, ketones, cellosolves, dimethylformamide, tetrahydrofuran, propylene glycol monomethyl ether, toluene, and xylene, or a mixture thereof.

In connection with this, as the lower alcohols, methanol, ethanol, isopropyl alcohol, butyl alcohol, isobutyl alcohol, or diacetone alcohol may be used. As the acetates, methyl acetate, ethyl acetate, isopropyl acetate, butyl acetate, or cellosolve acetate may be used, and as the ketones, methyl ethyl ketone, methyl isobutyl ketone, acetyl acetone, or acetone may be preferably used, but not limited thereto.

The composition for an anti-glare film according to the present invention may further include a UV curing initiator for the purpose of the curing by UV irradiation, and the UV curing initiator may be added in an amount of 0.1 to 10 parts by weight based on 100 parts by weight of the binder resin. Preferably, the composition for an anti-glare film according to the present invention may include a binder resin, a core-shell particle, an organic solvent, and a UV curing initiator.

In the case the amount of the UV curing initiator is less than 0.1 parts by weight, the sufficient curing may not occur. In the case the amount of the UV curing initiator is more than 10 parts by weight, the film strength of the anti-glare film may be reduced.

As the UV curing initiator, a single material selected from 1-hydroxy cyclo-hexylphenyl ketone, benzyl dimethyl ketal, hydroxy dimethyl acetophenone, benzoine, benzoine methyl ether, benzoine ethyl ether, benzoine isopropyl ether, and benzoine butyl ether, or a mixture of two or more materials may be used preferably, but not limited thereto.

The composition for an anti-glare film according to the present invention may further include one or more additives selected from a leveling agent, a wetting agent, a defoaming agent and silica having an average particle diameter in the range of 1 to 50 nm.

The additives may be added in an amount of 0.01 to 10 parts by weight based on 100 parts by weight of the binder resin.

The leveling agent may allow the surface of the coating film that is coated with the composition for an anti-glare film according to the present invention to be even.

Since the wetting agent may function to reduce the surface energy of the composition for an anti-glare film according to the present invention, the uniform coating may be obtained when the composition for the anti-glare film is coated on the transparent substrate layer.

The defoaming agent may be added to remove bubbles in the composition for an anti-glare film according to the present invention.

The silica is an inorganic material particle, and is added to increase the resistance to scratch and film strength of the coating film. In the case the particle diameter is in the range of 1 to 50 nm, since a transparent coating film may be ensured and optical properties of the coating film cannot be affected, which is desirable.

Meanwhile, the anti-glare coating film according to the present invention comprises a binder resin, and an anti-glare layer that includes a core-shell particle having an average surface roughness ([Rz]) in the range of 0 to 2 μm.

In configuration of the anti-glare layer, the description of the composition for an anti-glare film according to the present invention is all applied thereto. Thus, a detailed description thereof will be omitted.

The anti-glare coating film may further include a transparent substrate layer that is provided at least one side of the anti-glare layer and/or a low reflective layer that is provided on the anti-glare layer.

The thickness of the low reflective layer may be in the range of 40 to 200 nm, and the refractive index of the low reflective layer may be in the range of 1.2 to 1.45.

Examples of the low refractive material that forms the low reflective layer include metal fluorides having the refractive index of 1.40 or less such as NaF, LiF, $Alf_3$, $Na_5Al_3F_{14}$, $Na_3AlF_6$, $MgF_2$, and $YF_3$. They may be used alone or in a mixture of two or more species, and it is preferable that the size be in the range of 1 to 100 nm.

In addition, fluorine-based silane that is used in the low reflective layer is tridecafluorocctyltriethoxy silane, heptadecafluorodecyltrimethoxy silane, or heptadecafluorode-cyltriisopropoxy silane, and they may be used alone or in a mixture of two or more species. The material that forms the low reflective layer is not limited thereto.

The anti-glare film may further include a transparent substrate layer that is provided on at least one side of the anti-glare layer and/or an anti-pollution layer that is provided on the anti-glare layer.

The thickness of the anti-pollution layer may be more than 0 and 100 nm or less, and the anti-pollution layer may be formed by using a monofunctional and polyfunctional acrylate including a fluorine group, but not limited thereto.

The anti-glare film according to the present invention may include a transparent substrate layer; and an anti-glare layer that is provided on the transparent substrate layer and is formed of a composition for an anti-glare film.

In addition, the anti-glare film according to the present invention may include a transparent substrate layer; an anti-glare layer that is provided on the transparent substrate layer and is formed of a composition for an anti-glare film; and a low reflective layer that is provided on the anti-glare layer.

In addition, the anti-glare film according to the present invention may include a transparent substrate layer; an anti-glare layer that is provided on the transparent substrate layer and is formed of a composition for an anti-glare film; and an anti-pollution layer that is provided on the anti-glare layer.

In addition, the anti-glare film according to the present invention may include a transparent substrate layer; an anti-glare layer; a low reflective layer; and an anti-pollution layer.

The anti-glare film according to the present invention may be used for high resolution flat panel displays.

Meanwhile, a method of producing the anti-glare film according to the present invention may include steps of a)

coating the composition for an anti-glare film according to the present invention on the transparent substrate layer; and b) curing the resulting film.

In the step a), a wet coating method may be used, and examples thereof may include a roll coating method, a bar coating method, a spray coating method, a dip coating method, and a spin coating method. The coating method is not limited thereto, and needless to say, various types of different coating methods that are known in the art may be used.

The step b) may be performed while being divided into a drying step and a curing step, or in a single step.

Hereinafter, the present invention will be described in detail with reference to the drawings. However, the scope of the present invention is not limited thereto.

Figure 1:
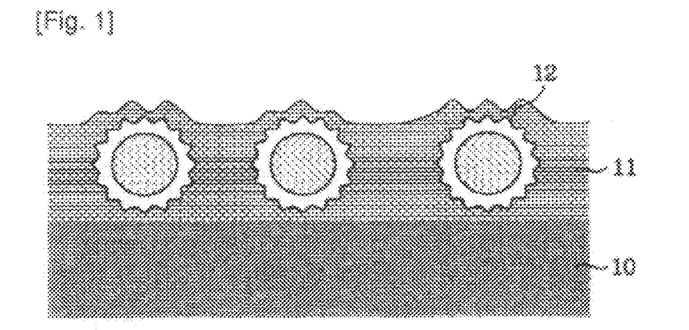
FIG. 1 is a sectional view of an anti-glare film according to an embodiment of the present invention.

The anti-glare film according to the present invention, as shown in FIG. 1, includes a transparent substrate layer 10; and an anti-glare layer 11 that is layered on the transparent substrate layer 10 and is formed of the composition for an anti-glare film according to the present invention.

The configuration of the transparent substrate layer 10 is not limited, but a layer that is typically used in the art to which the present invention belongs may be used.

For example, the layer may be made of a material selected from triacetylcellulose (TAC), polyethylene terephthalate (PET), polyethylene naphthalate (PEN), poly-carbonate (PC) and a norbornene polymer. However, the material is not limited thereto, but, needless to say, another material that is typically used to produce a transparent substrate layer in the art to which the present invention belongs may be used.

In connection with this, in the case the anti-glare film is applied to a polarizing plate of high resolution display, the transparent substrate 10 is preferably produced by using tri-acetylcellulose.

In the transparen substrate layer 10, the transmittance is at lest 85%, the haze value is 1% or less, and the thickness is in the range of 30 to 120 μm, but not limite thereto.

The anti-glare layer 11 protects the transparent substrate layer 10, has excellent anti-glare property, image clarity and contrast, and functions to improve mechanical strength of the final film.

The anti-glare layer 11 is cured by coating an electronic beam (EB) or ultraviolet (UV) curable binder resin on the transparent substrate layer 10, and the drying thickness thereof may be in the range of 1 to 20 μm.

An acrylate-based resin may be used as the curable binder resin. For example, a reactive acrylate oligomer, a polyfunctional acrylate monomer or a mixture thereof may be used.

The curing condition depends on the combination ratio or the component, and generally, in the case of the electronic beam or UV beam, the irradiation amount thereof is 200 to 1,000 mJ/cm$^2$ and the curing is preferably performed for 1 sec to 10 min.

In the electronic beam or UV curing, in the case the curing time is less than 1 sec, since the binder resin is not sufficiently cured, mechanical properties such as wear resistance may be poor, and in the case the curing time is more than 10 min, the yellowing may occur on the transparent substrate layer 10.

In order to produce the anti-glare layer 11 as shown in FIG. 1, a roll coating method or a bar coating method may be used, but not limited thereto. Various methods that are typically used in the art to which the present invention belongs may be used.

Core-shell particles 12 in which the surface roughness is controlled are dispersed in the anti-glare layer 11.

In the case the concave and the convex pattern are formed on the surface of the core-shell particle 12, as shown in FIG. 1, they are positioned in the anti-glare layer 11, the concave and the convex pattern are formed on the surface of the anti-glare layer 11.

In the case the concave and the convex patterns are formed on the surface of the core-shell particle 12, that is, in the case the surface of the core-shell particle 12 is rough, incident light from the outside may be scattered in various angles by using the concave and the convex patterns. Thereby, reflection light that is recognized by a user may be reduced.

In addition to the shape of the core-shell particle 12 in which the surface roughness is controlled as shown in FIG. 1, the shape of the core-shell particle in which surface roughness is controlled according to the present invention may be various as shown in FIGS. 2 to 6.

The spherical core-shell particle as shown in FIG. 2 is a core-shell particle having no surface roughness, the core and the shell that surrounds the core all have the circular cross section shape, and the concave and the convex patterns are not formed on the surfaces of the core and the shell.

The modified spherical core-shell particle as shown in FIG. 3 is a core-shell particle having the surface roughness, the core having no surface roughness has the circular cross section shape, and on the surface thereof, the concave and the convex patterns are not formed. In the case of the shell having the surface roughness, and on the surface thereof, the concave and the convex patterns are formed.

The modified spherical core-shell particle as shown in FIG. 4 is a core-shell particle having the surface roughness, in the case of the core having the surface roughness, on the surface thereof, the concave and the convex patterns are formed. In the case of the shell having the surface roughness, on the surface thereof, the concave and the convex patterns are formed.

The modified spherical core-shell particle as shown in FIG. 5 is a core-shell particle having the surface roughness, the core having no surface roughness has the circular cross section shape, and the surface thereof is surrounded by the spherical shell particles.

The modified spherical core-shell particle as shown in FIG. 6 is a core-shell particle having the surface roughness, in the case of the core having the surface roughness, on the surface thereof, the concave and the convex patterns are formed, and the surface of the core is surrounded by the spherical shell particles.

Mode for the Invention

Hereinafter, embodiments of the invention will be described in detail with reference to Examples for the production of the anti-glare film. The present invention may, however, be embodied in many different forms and should not be construed as being limited to the embodiments set forth herein. Rather, these embodiments are provided such that this disclosure will be thorough and complete and will fully convey the concept of the invention to those skilled in the art.

EXAMPLE 1

(Production of the Composition for the Anti-glare Film)

10 g of the urethane acrylate oligomer, 20 g of dipentaerythritol hexaacrylate (DPHA) as the polyfunctional acrylate monomer, 2 g of the core-shell particle that has the average particle diameter of 3.5 μm an and the average surface roughness ($[R_z]$) of 30 nm, 30 g of methyl ethyl ketone and 38 g of toluene as the organic solvent, and 2 g of the UV curing initiator were uniformly mixed with each other to produce the composition for the anti-glare film.

(Production of the Anti-glare Film)

After the composition for the anti-glare film in a liquid phase, which was produced by the above method according to the roll coating method, was coated on the transparent substrate layer (thickness of 80 μm) that was made of triacetyl cellulose so that the drying thickness was 4 μm, UV of 280 mJ/cm² was irradiated to cure the layer.

EXAMPLE 2

After the composition for the anti-glare film was produced by using the same method as Example 1, except that the core-shell particle that had the average particle diameter of 3.5 μm and the average surface roughness ($[R_z]$) of 300 nm was used instead of the core-shell particle used in Example 1, the anti-glare film was produced by using this.

COMPARATIVE EXAMPLE 1

After the composition for the anti-glare film was produced by using the same method as Example 1, except that the core-shell particle that had the average particle diameter of 3.5 μm and the solid structure but did not have the surface roughness was used instead of the core-shell particle used in Example 1, the anti-glare film was produced by using this.

COMPARATIVE EXAMPLE 2

After the composition for the anti-glare film was produced by using the same method as Example 1, except that the amount (2 g) of the core-shell particle used in Example 1 was reduced in an amount of 0.1 g, the anti-glare film was produced by using this.

COMPARATIVE EXAMPLE 3

After the composition for the anti-glare film was produced by using the same method as Example 1, except for the amount (2 g) of the core-shell particle used in Example 1 was increased in an amount of 10 g, the anti-glare film was produced by using this.

EXPERIMENTAL EXAMPLE 1

Figure 7:
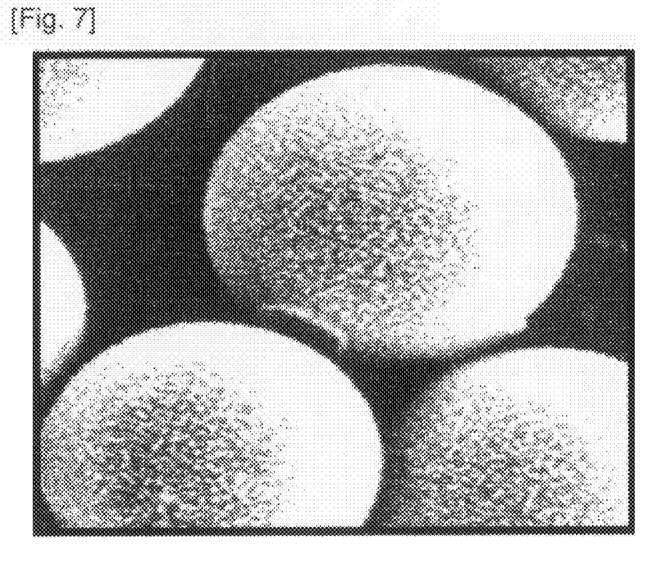
FIG. 7 is a scanning electronic microscope (SEM) picture of core-shell particles that are used in the anti-glare films according to Example 1, Comparative Example 2 and Comparative Example 3.
Figure 8:
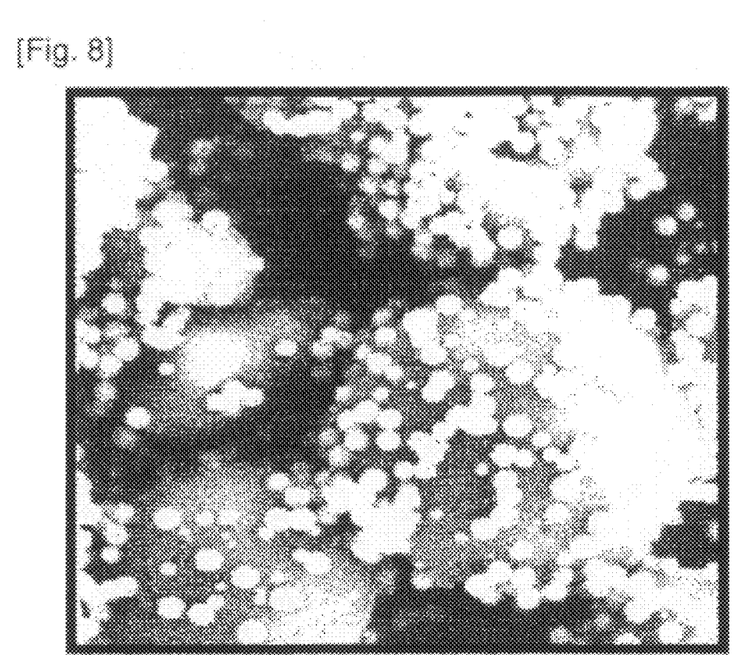
FIG. 8 is a scanning electronic microscope (SEM) picture of core-shell particles that are used in the anti-glare film according to Example 2.
Figure 9:
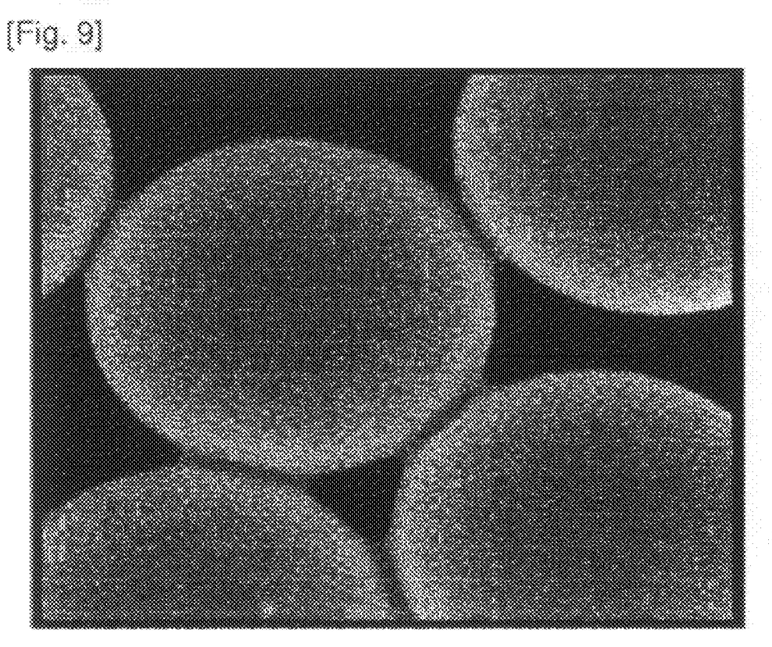
FIG. 9 is a scanning electronic microscope (SEM) picture of core-shell particles that are used in the anti-glare film according to Comparative Example 1.

FIGS. 7 to 9 are scanning electronic microscope (SEM) pictures that illustrate the surface roughness of core-shell particles that are used in Examples 1 and 2, and Comparative Examples 1 to 3.

FIG. 7 is a scanning electronic microscope picture of core-shell particles that are used in Example 1, Comparative Example 2 and Comparative Example 3, and have an average particle diameter of 3.5 μm an and an average surface roughness ($[R_z]$) of 30 nm, FIG. 8 is a scanning electronic microscope picture of core-shell particles that are used in Example 2, and have an average particle diameter of 3.5 μm and an average surface roughness ($[R_z]$) of 300 nm, and FIG. 9 is a scanning electronic microscope picture of solid type of core-shell particles that are used in Comparative Example 1, and have an average particle diameter of 3.5 μm and no average surface roughness.

Through the scanning electronic microscope pictures of FIGS. 7 to 9, it can be seen that the degree of relative surface roughness can be confirmed by eyes in respects to the core-shell particles.

EXPERIMENTAL EXAMPLE 2

Physical properties of the anti-glare films according to Examples 1 and 2 and Comparative Examples 1 to 3 were measured under the following conditions, and the results are described in the following Table 1.

Transmittance (%)

The transmittance was measured by using HR-100 manufactured by Murakami Color Research Laboratory, Co.

Haze Value (%)

The haze value was measured by using HR-100 manufactured by Murakami Color Research Laboratory, Co.

60° Reflection Gloss

The 60° reflection gloss was measured by using micro-TRI-gloss manufactured by BYK Gardner, Co.

Image Clarity

The image clarity was measured by using ICM-1T manufactured by Suga Test Instrument Co., Ltd.

Contrast

The dark room contrast and the bright room contrast were measured based on Korean Standard (KS C IEC 61988-2-1).

Scratch Resistance

Steel cotton (#0000) was provided on the hammer having the weight of 1 kg, and the resulting hammer was rubbed by the anti-glare film ten times. Then, the observation was performed.

◎: Number of scratchs: 0

○: Number of scratchs: thin five scratches having the size of 1 cm or less

Δ: Number of scratchs: five or more thin scratches having the size of 1 cm or less or 1 to 3 long scratches having the size of 1 cm or more x: Number of scratchs: 3 or more long scratches having the size of 1 cm or more Storage Stability ○: after 1 week when the anti-glare coating film was manufactured by using the coating composition, in the case the stability is 5% or less and there is no change in the haze value of the film, the 60° gloss, and the image clarity x: after 1 week when the anti-glare coating film was manufactured by using the coating composition, in the case the stability is more than 5% and there is no change in the haze value of the film, the 60° gloss, and the image clarity Table 1

TABLE 1

| Section | | Example 1 | Example 2 | Comparative Example 1 | Comparative Example 2 | Comparative Example 3 |
|---|---|---|---|---|---|---|
| transmittance (%) | | 93.9 | 93.5 | 93.6 | 94.1 | 92.8 |
| Haze (%) | | 10.1 | 9.9 | 9.5 | 0.3 | 48 |
| 60° reflection gloss | | 70 | 64 | 110 | 135 | 25 |
| Image clarity | | 281 | 210 | 150 | 388 | 32 |
| Contrastration | Dark room | 210 | 223 | 213 | 350 | 180 |
| | Bright room | 533 | 521 | 520 | 550 | 502 |
| Resistance to scratch | | ◎ | ◎ | ◎ | ◎ | X |
| Storage stability | | ◎ | ◎ | X | ◎ | ◎ |

As shown in Table 1, in the case of Examples 1 and 2 in which the particle having the controlled surface roughness is used, it can be seen that the storage stability is excellent, and the anti-glare property, image clarity and contrast are excellent.

On the other hand, in the case of Comparative Example 1 in which the particle having no surface roughness is used, the 60° reflection gloss is 110, the anti-glare property of the coating film is reduced, and the storage stability is reduced bemuse of agglomeration between the swollen particles.

In addition, in the case of Comparative Example 2 in which the amount of the particle having the surface roughness is less than 1 part by weight, the haze value is very low, the 60° reflection gloss is 135, and the anti-glare property of the Loafing film is very poor. In the case of Comparative Example 3 in which the core-shell particle having the surface roughness is more than 30 parts by weight, the anti-glare property is excellent, but the image clarity is significantly reduced.

Optimum Examples of the present invention are described. In connection with this, the used terms are given to illustrate, but are not to be construed to limit the scope of the present invention disclosed in claims.

The invention claimed is:

1. A composition for an anti-glare film, comprising:
a binder resin; and
a core-shell particle having an average surface roughness ([Rz]) in the range of 0 to 2 μm.

2. The composition for an anti-glare film as set forth in claim 1, wherein a difference between average refractive indices of the core-shell particle and the binder resin is 0 to 0.2.

3. The composition for an anti-glare film as set forth in claim 1, wherein the core-shell particle is added in an amount of 1 to 30 parts by weight based on 100 parts by weight of the binder resin.

4. The composition for an anti-glare film as set forth in claim 1, wherein the core-shell particle comprises a core and a shell that is positioned on a surface of the core, a diameter of the core is in the range of 0.5 to 5 μm, a difference between the refractive indices of the core and the binder resin is in the range of 0.02 to 0.3, a thickness of the shell is in the range of 0.01 to 2 μm, and a difference between the refractive indices of the shell and the binder resin is in the range of 0 to 1.

5. The composition for an anti-glare film as set forth in claim 1, wherein the core-shell particle comprises a core having a circular cross section or a convex and concave pattern formed on a surface thereof, and a shell that is positioned on a surface of the core and has a circular cross section or a convex or concave pattern formed on a surface thereof.

6. The composition for an anti-glare film as set forth in claim 1, wherein the core-shell particle comprises a core having a circular cross section or a convex and concave pattern formed on a surface thereof, and a shell particle that is positioned on a surface of the core.

7. The composition for an anti-glare film as set forth in claim 1, wherein a difference between the average refractive index of the core-shell particle that is calculated by using the following Equation 1 and the refractive index of the binder resin is in the range of 0 to 0.2:

$$\text{average refractive index} = [f_{core} n_{core}^2 + f_{shell} n_{shell}^2]^{0.5} \quad \text{[Equation 1]}$$

wherein $f_{shell}$ is calculated by using $(R^3_{core\text{-}shell} - R^3_{core})/R^3_{core\text{-}shell}$, which means a volume ratio of the shell in the total core-shell particle volume, fcore is calculated by using $(R_{core}/R_{core\text{-}shell})^3$, which means a volume ratio of the core in the total core-shell particle volume, $R_{core}$ means a radius of the core, and $R_{core\text{-}shell}$ means a radius of the core-shell particle.

8. The composition for an anti-glare film as set forth in claim 1, wherein an average surface roughness ([Rz]) of the core-shell particle that is calculated by using the following Equation 2 is in the range of 0 to 2 μm:

$$\text{Average surface roughness} = [R_z] = \sum_{i=1}^{n} R_{zi}/n \quad \text{[Equation 2]}$$

wherein $R_{zi}$ is a height of each concave element and convex element of the surface, and n is a number of the concave element and the convex element of the surface.

9. The composition for an anti-glare film as set forth in claim 1, wherein the core of the core-shell particle comprises a single material or a complex thereof selected from the group consisting of an organic material and an inorganic material, and the shell of the core-shell particle comprises a single material or a complex thereof selected from the group consisting of an organic material and an inorganic material, and the shell of the core-shell particle is made of a material that is different from a material of the core.

10. The composition for an anti-glare film as set forth in claim 9, wherein the organic material that forms the core is a single material or a copolymer of two or more materials selected from the group consisting of polystyrene, polyacrylate-co-styrene, polymethylacrylate-co-styrene, polymethylmethacrylate-co-styrene, polycarbonate, polyvinyl chloride, polybutyleneterephthalate, polyethyleneterephthalate, polyamides, polyimides, polysulfone, polyphenylene oxide, polyacetal, epoxy resin, phenol resin, melamine resin, benzoguanamine, polydivinylbenzene, polydivinylbenzene-co-styrene, polydivinylbenzene-co-acrylate, polydiallyl phthalate, and triallylisocyanurate polymer;

the inorganic material that forms the core is a single material or a complex of two or more materials selected from the group consisting of silica, amorphous titanium oxide, amorphous zirconium oxide, indium oxide, aluminum oxide, amorphous zinc oxide, amorphous cerium oxide, barium oxide, calcium carbonate, amorphous barium titanate, and barium sulfate;

the organic material that forms the shell is a single material or a copolymer of two or more materials selected from the group consisting of polydivinylbenzene, polydivinylbenzene-co-styrene, polydivinylbenzene-co-acrylate, epoxy resin, phenol resin, melamine resin, polydiallyl phthalate, and triallylisocyanurate polymer; and the inorganic material that forms the shell is a single material or a complex of two or more materials selected from the group consisting of silica, titanium oxide, zirconium oxide, indium oxide, aluminum oxide, zinc oxide, cerium oxide, barium oxide, calcium carbonate, barium titanate, magnesium fluoride, calcium fluoride, and barium sulfate.

11. The composition for an anti-glare film as set forth in claim 1, further comprising:
an organic solvent,
wherein the organic solvent is added in an amount of 50 to 500 parts by weight based on 100 parts by weight of the binder resin.

12. The composition for an anti-glare film as set forth in claim 1, further comprising:
a UV curing initiator,
wherein the UV curing initiator is added in an amount of 0.1 to 10 parts by weight based on 100 parts by weight of the binder resin.

13. The composition for an anti-glare film as set forth in claim 1, further comprising:
   one or more additives selected from the group consisting of a leveling agent, a wetting agent, a defoaming agent and silica having an average particle diameter in the range of 1 to 50 nm.

14. An anti-glare film comprising an anti-glare layer, wherein the anti-glare layer comprises:
   a binder resin; and
   a core-shell particle having an average surface roughness ([Rz]) in the range of 0 to 2 µm.

15. An anti-glare film as set forth in claim 14, wherein a difference between average refractive indices of the core-shell particle and the binder resin is 0 to 0.2.

16. The anti-glare film as set forth in claim 14, wherein the core-shell particle is added in an amount of 1 to 30 parts by weight based on 100 parts by weight of the binder resin.

17. The anti-glare film as set forth in claim 14, wherein the core-shell particle comprises a core and a shell that is positioned on a surface of the core, a diameter of the core is in the range of 0.5 to 5 µm, a difference between the refractive indices of the core and the binder resin is in the range of 0.02 to 0.3, a thickness of the shell is in the range of 0.01 to 2 µm, and a difference between the refractive indices of the shell and the binder resin is in the range of 0 to 1.

18. The anti-glare film as set forth in claim 14, wherein the core-shell particle comprises a core having a circular cross section or a convex or concave pattern formed on a surface thereof, and a shell that is positioned on a surface of the core and has a circular cross section or a convex and concave pattern formed on a surface thereof.

19. The anti-glare film as set forth in claim 14, wherein the core-shell particle comprises a core having a circular cross section or a convex and concave pattern formed on a surface thereof, and a shell particle that is positioned on a surface of the core.

20. The anti-glare film as set forth in claim 14, wherein a difference between the average refractive index of the core-shell particle that is calculated by using the following Equation 1 and the refractive index of the binder resin is in the range of 0 to 0.2:

$$\text{average refractive index} = [f_{core} n^2_{core} + f_{shell} n^2_{shell}]^{0.5} \quad \text{[Equation 1]}$$

wherein $f_{shell}$ is calculated by using $(R^3_{core-shell} - R^3_{core})/R^3_{core-shell}$, which means a volume ratio of the shell in the total core-shell particle volume, fcore is calculated by using $(R_{core}/R_{core-shell})^3$, which means a volume ratio of the core in the total core-shell particle volume, $R_{core}$ means a radius of the core, and $R_{core-shell}$ means a radius of the core-shell particle.

21. The anti-glare film as set forth in claim 14, wherein an average surface roughness ([Rz]) of the core-shell particle that is calculated by using the following Equation 2 is in the range of 0 to 2 µm;

$$\text{Average surface roughness} = [R_z] = \sum_{i=1}^{n} R_{zi}/n \quad \text{[Equation 2]}$$

wherein $R_{zi}$ is a height of each concave and convex of the surface, and n is a number of the concave and the convex of the surface.

22. The anti-glare film as set forth in claim 14, wherein the core of the core-shell particle comprises a single material or a complex thereof selected from the group consisting of an organic material and an inorganic material, and
   the shell of the core-shell particle comprises a single material or a complex thereof selected from the group consisting of an organic material and an inorganic material, and the shell of the core-shell particle is made of a material that is different from a material of the core.

23. The anti-glare film as set forth in claim 22, wherein the organic material that forms the core is a single material or a copolymer of two or more materials selected from the group consisting of polystyrene, polyacrylate-co-styrene, polymethylacrylate-co-styrene, polymethylmethacrylate-co-styrene, polycarbonate, polyvinyl chloride, polybutyleneterephthalate, polyethyleneterephthalate, polyamides, polyimides, polysulfone, polyphenylene oxide, polyacetal, epoxy resin, phenol resin, melamine resin, benzoguanamine, polydivinylbenzene, polydivinylbenzene-co-styrene, polydivinylbenzene-co-acrylate, polydiallyl phthalate, and triallylisocyanurate polymer;
   the inorganic material that forms the core is a single material or a complex of two or more materials selected from the group consisting of silica, amorphous titanium oxide, amorphous zirconium oxide, indium oxide, aluminum oxide, amorphous zinc oxide, amorphous cerium oxide, barium oxide, calcium carbonate, amorphous barium titanate, and barium sulfate;
   the organic material that forms the shell is a single material or a copolymer of two or more materials selected from the group consisting of polydivinylbenzene, polydivinylbenzene-co-styrene,polydivinylbenzene-co-acrylate, epoxy resin, phenol resin, melamine resin, polydiallyl phthalate, and triallylisocyanurate polymer; and
   the inorganic material that forms the shell is a single material or a complex of two or more materials selected from the group consisting of silica, titanium oxide, zirconium oxide, indium oxide, aluminum oxide, zinc oxide, cerium oxide, barium oxide, calcium carbonate, barium titanate, magnesium fluoride, calcium fluoride, and barium sulfate.

24. The anti-glare film as set forth in claim 14, further comprising:
   a transparent substrate layer that is provided on at least one side of the anti-glare layer.

25. The anti-glare film as set forth in claim 14, further comprising:
   a low reflective layer that is provided on the anti-glare layer.

26. The anti-glare film as set forth in claim 14, further comprising:
   an anti-pollution layer that is provided on the anti-glare layer.

* * * * *